United States Patent
Murata et al.

(10) Patent No.: US 6,991,863 B2
(45) Date of Patent: Jan. 31, 2006

(54) MAGNETIC DISK SUBSTRATE AND MAGNETIC DISK

(75) Inventors: Naoki Murata, Kawasaki (JP); Haruhiko Takahashi, Kawasaki (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 10/362,732

(22) PCT Filed: Sep. 4, 2001

(86) PCT No.: PCT/JP01/07642

§ 371 (c)(1),
(2), (4) Date: Feb. 27, 2003

(87) PCT Pub. No.: WO02/21517

PCT Pub. Date: Mar. 14, 2002

(65) Prior Publication Data

US 2003/0186085 A1    Oct. 2, 2003

(30) Foreign Application Priority Data

Sep. 4, 2000 (JP) ............................ 2000-267672

(51) Int. Cl.
*G11B 5/82* (2006.01)
(52) U.S. Cl. .................... 428/848; 428/847.8
(58) Field of Classification Search ............. 428/64.2, 428/65.3, 64.3, 323, 694 SL
See application file for complete search history.

(56) References Cited

U.S. PATENT DOCUMENTS 6,066,380 A * 5/2000 Oyanagi et al. ........... 428/64.1
6,433,102 B1 * 8/2002 Suzuki et al. ............. 525/333.3
6,722,057 B2 * 4/2004 Tei et al. ..................... 34/406

FOREIGN PATENT DOCUMENTS

| EP | 0 858 070 A1 | 8/1998 |
| EP | 1 001 408 A2 | 5/2000 |
| EP | 1 270 607 A1 | 1/2003 |
| JP | A 03-014882 | 1/1991 |
| JP | A 03-122137 | 5/1991 |
| JP | A 04-170425 | 6/1992 |
| JP | 5-89514 | 4/1993 |
| JP | A 05-089514 | 4/1993 |
| JP | 11-134711 | 5/1999 |
| JP | A 11-134711 | 5/1999 |
| JP | WO00/34340 * | 6/2000 |
| WO | WO98/08217 A1 | 2/1998 |
| WO | WO 98/08217 A1 | 2/1998 |

* cited by examiner

*Primary Examiner*—Stevan A. Resan
(74) *Attorney, Agent, or Firm*—Armstrong, Kratz, Quintos, Hanson & Brooks, LLP (57) ABSTRACT

The present invention relates to a magnetic disk substrate formed of a thermoplastic resin and a magnetic disk comprising a magnetic recording layer formed on the magnetic disk substrate. In the magnetic disk substrate of the invention, the amount of gases generated therefrom upon held at 90° C. for 1 hour is 100 $\mu g/cm^2$ or less, so that when scanned by a floating head, errors on recording and reading of information are remarkably reduced. Thus, the magnetic disk substrate can provide a magnetic disk having improved scan capability. The present invention also provides a process for manufacturing such a magnetic disk.

11 Claims, 1 Drawing Sheet

Fig. 1

MAGNETIC DISK SUBSTRATE AND MAGNETIC DISK

TECHNICAL FIELD

The present invention relates to a magnetic disk substrate formed of a thermoplastic resin and a magnetic disk comprising a magnetic layer (magnetic recording layer) formed on the magnetic disk substrate. The present invention is also concerned with a process for manufacturing a magnetic disk from thermoplastic resins.

BACKGROUND ART

Magnetic disks such as hard disks and removable hard disks (e.g., floppy disks and MO disks) are now used as external storage for computers. A magnetic disk is a disk coated with a magnetic material on its surface, and data are written on or read from the disk using a magnetic head.

Commonly, a hard disk for computers comprises a hard aluminum substrate coated with a magnetic material on its surface. One or plural such hard disks are received in a closed casing, wherein they are rotated at high speed. A magnetic head is slightly floated from the surface of the hard disk for data write/read purposes.

Thus, the hard disk is usually designed to write and read information by means of a magnetic head located in the vicinity of the surface of the hard disk and floated thereover. Such a magnetic head is called a "floating head". The distance between the magnetic head and the surface of the hard disk is very short, ordinarily of the order of a few $\mu$m or less. In addition, the hard disk is rotated at high speed; as the magnetic head comes in collision with the surface of the hard disk by reason of entrance of dust, impacts from outside, sudden power failures, etc., data may vanish or the magnetic head may break down. As a matter of course, when there are projections, if minute, from the surface of the hard disk, the magnetic head may collide therewith, causing errors. Although depending on the size and number of projections from the surface of the hard disk, the magnetic head may break down due to impacts on collision.

On the other hand, the magnetic head is mounted on the floating slider to write and read data on and from the hard disk while slightly floated over the surface of the hard disk. To reduce spacing losses of the magnetic head as much as possible upon writing and reading, the floating quantity of the magnetic head (the distance from the magnetic head to the surface of the hard disk) should now be reduced to the greatest extent practicable. In some systems known to date, the floating quantity is dwindled from a conventional several $\mu$m down to the order of 50 to 70 nm.

To eliminate minute projections on the surface of the hard disk, an aluminum substrate for hard disks must greatly be improved in terms of flatness and smoothness. For this reason, aluminum substrates are now fabricated by lathing or pressure annealing an aluminum substrate blank to remove the undulation of the principal surface, then forming an electroless plating layer on that principal surface, and finally polishing the plated layer to a mirror-smooth state.

However, such an aluminum substrate processing method is troublesome and poor in productivity, making it difficult to cut down on production costs. In addition, it is impossible to provide such an aluminum substrate with the projection-and-pit arrangement necessary for where servo marks are to be formed.

In recent years, it has thus been put forward to fabricate magnetic disk substrates such as hard disk substrates using thermoplastic resins. Thermoplastic resins can easily be configured into moldings of any desired shape by melt processing such as injection molding. In addition, if the surface roughness of molds or stampers used for injection molding is previously reduced, it is then possible to obtain moldings excelling in smoothness.

Even by use of injection molding of thermoplastic resins, however, it is in effect very difficult to obtain magnetic disk substrates having high reliability.

JP-A 04-170425 proposes forming a disk substrate with a molding material that is a hydrogenated product of a ring-opening polymer of a norbornene monomer, wherein the volatile component content is 0.3% by weight or lower and the content of foreign matter of 0.5 $\mu$m or greater is $1\times10^5$ or less. This disk substrate is reduced in terms of voids and silver streaks resulting from volatile components as well as the content of foreign matter, and so is useful for an optical disk substrate. Voids and silver streaks are responsible for errors upon reading of signals by an optical disk using laser beams; however, molding defects such as voids and silver streaks can be eliminated by decreasing the content of volatile components, thereby correcting the optical disk for possible errors.

However, the results of investigations by the inventors have taught that although the disk substrate set forth in the aforesaid publication is useful for an optical disk substrate, a reliability problem arises when it is used for the substrate of a magnetic disk that operates proximately to a magnetic head as is the case with a hard disk.

Possible reasons could be that (1) no full removal of low-molecular components is achievable under drying conditions that the hydrogenated products of ring-opening polymers specified in the publication are vacuum dried at 260° C., and (2) at the foreign matter content level of $6\times10^4$ to $9\times10^4$/g described in the publication, any complete prevention of minute projections from the surface of the disk substrate is unachievable.

WO 98/08217 proposes a disk substrate comprising a resinous disk substrate, characterized in that on the surface to be scanned by a floating head there is no projection having a height of 50 nm or greater. This publication also diskloses a disk substrate fabrication method by injection molding, wherein a resin solution is filtered by a filter to prepare a resin in which the content of particles of 0.5 $\mu$m or greater in particle diameter is $1\times10^4$/g or less, and the resin is injection molded to a disk substrate.

The magnetic disk manufactured using the disk substrate set forth in the aforesaid publication, because of having no minute projection on the surface to be scanned by a floating head, is found to be much more reduced in terms of errors upon writing and reading of information than conventional disks. However, the results of studies by the inventors have revealed that the effect of this magnetic disk on prevention of errors is still less than satisfactory, and that adhesion between the disk substrate and the magnetic layer becomes insufficient.

DISCLOSURE OF THE INVENTION

It is an object of the present invention to provide a magnetic disk substrate formed of a thermoplastic resin, which can provide a magnetic disk that, when scanned by a floating head, is remarkably reduced in terms of errors upon writing and reading of information, and that is excellent in scan capability.

Another object of the present invention is to provide a magnetic disk comprising a magnetic recording layer formed on the surface of the aforesaid magnetic disk substrate, which is excellent in scan capability.

Yet another object of the present invention is to provide a process for manufacturing a magnetic disk substrate that has such excellent properties.

As a result of intensive studies made so as to attain these objects, the inventors have found out that the reason why a magnetic disk is not free from an error problem irrespective of elimination of projections of 50 nm or greater in height from the surface of a disk substrate lies in a trace amount of gas generated from a magnetic disk substrate after molding.

Given a magnetic disk substrate susceptible to generation of gas, the gas generated from the magnetic disk substrate adheres to and solidifies at the portion of a floating head nearest to the surface of the a magnetic disk. Then, the resulting solid lump comes into contact with the surface of the magnetic disk, and so the floating head vibrates, ending up with the occurrence of errors.

The gas generated from the magnetic disk substrate also causes a decrease in the adhesion between the magnetic disk substrate and a magnetic recording film. This in turn causes the magnetic recording film to peel off upon collision of the surface of the magnetic disk with the floating head.

With these facts in mind, the inventors tried to make modifications to drying conditions, etc. for thorough removal of low-molecular-weight components having a molecular weight of 1,000 or lower capable of turning to gases from thermoplastic resins used as the raw material for magnetic disk substrates. As a consequence, the inventors have arrived at a magnetic disk substrate which is formed of a thermoplastic resin and generates gases in an amount of 100 $\mu g/cm^2$ or less as measured upon held at 90° C. for 1 hour. When a magnetic disk such as a hard disk is manufactured using a magnetic disk substrate controlled such that the amount of gases per unit area upon held at a constant temperature for a constant time is limited to a specific or smaller amount, the occurrence of errors can significantly be reduced even upon scanning of the surface of the magnetic disk by a floating head located in proximity thereto. The present invention has been accomplished based on these findings.

Thus, the present invention provides a magnetic disk substrate formed of a thermoplastic resin, wherein the amount of gases generated therefrom upon held at 90° C. for 1 hour is 100 $\mu g/cm^2$ or less.

The present invention also provides a magnetic disk, which comprises a magnetic recording film formed on the aforesaid magnetic disk substrate.

Moreover, the present invention provides a process of manufacturing a magnetic disk substrate formed of a thermoplastic resin, characterized by comprising a series of steps of:

(1) using as the thermoplastic resin an alicyclic structure-containing polymer resin, and heating an organic solvent solution of the alicyclic structure-containing polymer resin under reduced pressure to dry the polymer and remove therefrom low-molecular-weight materials having a molecular weight of 1,000 or lower, thereby preparing a pellet, (2) drying the pellet by heating, depressurizing or heating under reduced pressure, and (3) forming a dried pellet into a magnetic disk substrate, thereby obtaining a magnetic disk substrate wherein the amount of gases generated therefrom upon held at 90° C. for 1 hour is 100 $\mu g/cm^2$ or less.

BEST MODE FOR CARRYING OUT THE INVENTION

1. Magnetic Disk Substrate (I) Amount of Gases Generated

The present invention provides a magnetic disk substrate formed of a thermoplastic resin, wherein the amount of gases generated upon held at 90° C. for 1 hour is 100 $\mu g/cm^2$ or less. The amount of gases generated from the magnetic disk substrate is preferably 80 $\mu g/cm^2$ or less, and more preferably 60 $\mu g/cm^2$ or less. In most cases, the amount of gases generated can be reduced down to 50 $\mu g/cm^2$ or less, especially 30 $\mu g/cm^2$ or less. When the amount of gases generated is 20 $\mu g/cm^2$ or less, particularly preferable results are obtainable in terms of the smoothness of the substrate.

When a magnetic disk is manufactured by forming a magnetic recording film on the magnetic disk substrate in which the amount of gases generated per unit area is in the aforesaid range, the magnetic disk can be substantially free from errors because of no defoliation of the magnetic recording film or no contact of a floating head with the surface of the magnetic disk. As the amount of gases generated becomes too large, the gases generated from the magnetic disk substrate may adhere to and solidify at the end of the floating head, possibly resulting in contact of the resulting solid with the surface of the magnetic disk upon scanning by the floating head. Too much gases also cause a decrease in the adhesion between the magnetic disk substrate and the magnetic recording film.

The amount of gases generated from the magnetic disk substrate may be measured by dynamic headspace gas chromatography mass spectrometry (DHS-GC-MS method). When this method is used, the gases generated from the magnetic disk substrate are collected by means of a solid adsorbent and concentrated, and then poured in a sample pouring port of a DHS-GC-MS device.

(II) Low-Molecular-Weight Components

The gases generated from the magnetic disk substrate are composed of various low-molecular-weight components contained in the thermoplastic resin. By way of example but not by way of limitation, such low-molecular-weight components include unreacted monomers, oligomers, low-molecular-weight polymers, resin-decomposed products, additives, decomposed products of additives, organic solvents and water as well as their mixtures. Typical low-molecular-weight components include those having a molecular weight of 1,000 or lower and turning to gases at a temperature of 90° C. under normal pressure.

More specifically, the low-molecular-weight components having a molecular weight of 1,000 or lower are exemplified by (i) unreacted monomer components remaining upon resin preparation, (ii) oligomer components (e.g., those having a polymerization degree of 10 or less), (iii) low-molecular-weight polymer components having a molecular weight of 1,000 or lower, (iv) resin-decomposed products, (v) organic solvents used for resin synthesis, (vi) moisture trapped in the resin during resin preparation or resin storage, and (vii) additives and their decomposition products.

Usually, the molecular weight of low-molecular-weight components is a weight-average molecular weight (Mw) determined in terms of polyisoprene as measured by gel permeation chromatography (GPC) using cyclohexane as a solvent.

The low-molecular-weight components contained in the thermoplastic resin differ depending on the type of the thermoplastic resin (the type of monomer), the type of additives, the type of organic solvents, etc. By way of illustration but not exclusively, the low-molecular-weight components include alkanes such as methane, ethane, propane and pentane; alcohols such as ethanol, propanol and butanol; ethers; esters such as dioctyl phthalate; organic acids such as formic acid and acetic acid; organic halogenide compounds such as methyl chloride and dichlorobenzene; silicones such as dimethylsiloxane; norbornene compounds and their oxides; cyclohexyl group-containing compounds; aromatic hydrocarbon compounds such as benzene, toluene and xylene; and ketones such as acetone and methyl ethyl ketone.

The proportion of a low-molecular-weight component having a molecular weight of 1,000 or lower contained in the thermoplastic resin is preferably 2% by weight or less, more preferably 1% by weight by less. In most cases, extremely satisfactory results are obtainable by use of thermoplastic resins containing 0.5% by weight or less of low-molecular-weight components.

(III) Shape

The magnetic disk substrate of the present invention has a disk shape having a center hole therein. The magnetic disk substrate of the present invention has a diameter of usually 10 to 500 mm, preferably 30 to 200 mm and a thickness of usually 0.1 to 50 mm, preferably 0.2 to 5 mm.

(IV) Other Properties

In addition to the requirement that the amount of gases generated upon held at 90° C. for 1 hour is 100 $\mu g/cm^2$ or less, the magnetic disk substrate of the present invention preferably has another requirement that on the surface of the disk substrate to be scanned by a floating head there is no projection of 50 nm or greater in height.

To this end, it is preferable to use a thermoplastic resin controlled such that the number of particles having a particle diameter of 0.5 $\mu m$ or greater is reduced down to $1 \times 10^4/g$ or less. Thus, when a magnetic disk substrate is formed using a thermoplastic resin controlled such that the number of particles having a particle diameter of 0.5 $\mu m$ or greater is reduced down to $1 \times 10^4/g$ or less, it is possible to reduce the number of particles contained in the magnetic disk substrate with a particle diameter of 0.5 $\mu m$ or greater down to $1 \times 10^4/g$ or less, thereby obtaining a magnetic disk substrate that has not substantially any projection of 50 nm or greater in height.

The magnetic disk substrate of the present invention is not only improved in terms of adhesion with a magnetic recording film formed thereon, but is also reduced in terms of pits on its surface to be scanned by a floating head, which may otherwise be responsible for errors upon writing and/or reading of signals. The pits ascribable to errors are a concave form of surface defects having a maximum width of 1 $\mu m$ or greater and a depth of 20 nm or greater as viewed from above. As such concave defects exist on the surface to be scanned, errors occur due to changes in the distance between the floating head and the surface of the substrate.

The number of pits having a depth of 20 nm or greater can more precisely be measured after the magnetic recording film has been formed on the surface of the magnetic disk substrate. That is, the surface of the magnetic recording film of the magnetic disk is scanned by the floating head, so that sites where errors occur can be examined by a bit error analyzer. Then, the sites where errors are found are analyzed under a scanning probe microscope to count the number of pits having a depth of 20 nm or greater. The number of pits accounts for the number of pits as counted all over the surface scanned by the floating head. The number of pits found on the surface of the magnetic disk substrate with a depth of 20 nm or greater is preferably 20 or less, more preferably 15 or less, and even more preferably 10 or less. According to the invention, it is possible to reduce the number of pits having a depth of 20 nm or greater down to 8 or less, and especially 5 or less.

2. Thermoplastic Resin (I) Type of Thermoplastic Resin

No specific limitation is imposed on the thermoplastic resin used in the present invention so far as it can be formed into a magnetic disk substrate. Exemplary thermoplastic resins are styrene resins such as polystyrene, acrylonitrile-styrene copolymers and acrylonitrile-butadiene-styrene copolymers; acrylic resins such as poly(methyl methacrylate) (PMMA); polyester resins such as poly(ethylene terephthalate), poly(butylene terephthalate) and liquid crystal polyesters; polycarbonate resins (PC); polyamide resins such as nylon; aromatic engineering resins such as poly (phenylene ether), poly(phenylene sulfide) and polyether ether ketone; olefin resins such as poly(methyl-1-pentene), polypropylene and polyethylene; and alicyclic structure-containing polymer resins such as norbornene polymers, vinyl alicyclic hydrocarbon polymers, mono-cyclic olefin polymers and cyclic conjugated diene polymers.

Among these, preference is given to PMMA, PC and alicyclic structure-containing polymer resins in consideration of the dimension accuracy of the magnetic disk substrate, and particular preference is given to the alicyclic structure-containing polymer resins in view of heat resistance and low water absorption.

(II) Alicyclic Structure-Containing Polymer Resin

The alicyclic structure-containing polymer resin preferably used in the present invention is a polymer that has an alicyclic structure in its main chain and/or its side chain. In consideration of mechanical strength and heat resistance, preference is given to polymer resins having an alicyclic structure in their main chains.

Exemplary alicyclic structures are cycloalkane structures and cycloalkene structures; however, the cycloalkane structures are preferred in view of mechanical strength and heat resistance.

The ring may be either a single ring or a condensed ring. The number of carbon atoms that form the ring is in the range of usually 4 to 30, preferably 5 to 20 and more preferably 1 to 15 in view of mechanical strength, heat resistance and moldability.

The proportion of the repetition unit having an alicyclic structure in the alicyclic structure-containing polymer resin may appropriately be determined depending on what purpose the resin is used for; however, that proportion is ordinarily 50% by weight or greater, preferably 70% by weight or greater, and more preferably 90% by weight or greater. That the proportion of the repetition unit having an alicyclic structure is in the aforesaid range is preferred with the transparency and heat resistance of the obtained magnetic disk substrate in mind.

Exemplary alicyclic structure-containing polymer resins are (1) a norbornene polymer, (2) a single-ring cyclic olefin polymer, (3) a cyclic conjugated diene polymer and (4) a vinyl alicyclic hydrocarbon polymer.

Among these, the norbornene polymer and vinyl alicyclic hydrocarbon polymer are preferred, and the norbornene polymer is more preferred in view of heat resistance and mechanical strength.

For the norbornene polymer, for instance, such known polymers as set forth in JP-A's 03-14882 and 03-122137, etc. may be used. To be more specific, (i) ring-opening polymers of norbornene monomers, (ii) hydrogenated products of ring-opening polymers of norbornene monomers, (iii) addition polymers of norbornene monomers and (iv) addition copolymers of norbornene monomers and vinyl compounds are mentioned. Among these, preference is given to the hydrogenated products of ring-opening polymers of norbornene monomers, the addition polymers of norbornene monomers and the addition copolymers of norbornene monomers and vinyl compounds in consideration of heat resistance, light resistance and weather resistance, and particular preference is given to the hydrogenated products of ring-opening polymers of norbornene monomers.

The norbornene monomers, for instance, include norbornene, dimethanooctahydronaphthalene, trimethanododecahydroanthracene and their substituted products; dicyclopentadiene, 2,3-dihydrodicyclopentadiene, dimethanooctahydrobenzoindene, dimethanodecahydrobenzoindene, dimethanodecahydrofluorene and their substituted products. The substituents, for instance, include hydrocarbon groups such as alkyl, alkylidene and aryl groups; cyano group, halogen group, alkoxycarbonyl group, pyridyl group, carboxyl group, and hydroxyl group. The norbornene monomers may be used alone or in combination of two or more.

The vinyl alicyclic hydrocarbon polymers, for instance, include polymers of vinyl alicyclic hydrocarbon monomers such as vinylcyclohexene and vinylcycloheane and their hydrogenated products; hydrogenated products of homopolymers of vinyl aromatic monomers such as styrene and α-methylstyrene (in this case, the aromatic ring moiety is also hydrogenated); and hydrogenated product of copolymers of α-olefins or conjugated dienes and vinyl aromatic monomers (in this case, the aromatic ring moiety is also hydrogenated). For the copolymers, random copolymers, pseudo-random copolymers, block copolymer, gradient block copolymers, etc. may be used without restraint.

(III) Molecular Weight & Glass Transition Temperature

The molecular weight of the thermoplastic resin used in the present invention is suitably selected as necessary for the end application intended. The weight-average molecular weight of the alicyclic structure-containing polymer resin is in the range of usually 5,000 to 500,000, preferably 8,000 to 200,000, and more preferably 10,000 to 100,000 in terms of polyisoprene as measured by gel permeation chromatography (GPC) using a cyclohexane solution (or a toluene solution in the case where the polymer resin is not dissolved in the cyclohexane solution). When the weight-average molecular weight is in the aforesaid range, the magnetic disk substrate excellent in the mechanical strength and moldability can be obtained.

The glass transition temperature, Tg, of the thermoplastic resin used in the present invention is suitably selected as necessary for the end application intended. However, in view of heat resistance, the glass transition temperature is usually 50 to 300° C., preferably 60 to 200° C., and more preferably 70 to 150° C.

3. Production Process of the Magnetic Disk Substrate

The magnetic disk substrate of the present invention may be obtained by molding of the thermoplastic resin. In general, injection molding is preferably chosen from molding processes.

(I) How to Remove Low-Molecular-Weight Components

To obtain the magnetic disk substrate in which the amount of gases generated upon held at 90° C. for 1 hour is restricted to 100 $\mu g/cm^2$ or less, it is preferable to use as the thermoplastic resin a synthesized thermoplastic resin from which the low-molecular-weight components are removed as much as possible. However, removal of the low-molecular-weight components is not easy, and so it is required to figure out various contrivances.

More specifically, the thermoplastic resin after synthesis is processed by appropriate combinations of the following methods, and then applied to the fabrication of magnetic disk substrates.

(i) Method in which the solution of the thermoplastic resin in an organic solvent is heated under reduced pressure, thereby drying the solution and removing low-molecular-weight components from it.

According to this method, it is preferable to heat the post-synthesis reaction solution of the thermoplastic resin under reduced pressure (a pressure that is lower than normal pressure), thereby evaporating off the low-molecular-weight components contained in the solvent and thermoplastic resin. This method will hereinafter be called the "direct drying method".

(ii) Method in which additives having a relatively high molecular weight are used in reduced amounts as the additives used if desired, for instance, antioxidants.

According to this method, it is preferable to add a small amount of an antioxidant having a molecular weight of 700 or higher to the post-synthesis reaction solution of the thermoplastic resin, and then heat the reaction solution under reduced pressure for drying and removal of the low-molecular-weight components contained in the thermoplastic resin. The addition of such an antioxidant enables the thermoplastic resin to be kept from decomposition even by heating at high temperature.

(iii) Method in which, before the thermoplastic resin is molded into a magnetic disk substrate, a molding blank material formed of that thermoplastic resin (typically a pellet) is heated and/or depressurized, followed by drying.

In the direct drying method (i), the organic solvent solution such as the reaction solution is heated at a temperature in the range of usually 270 to 340° C., and preferably 275 to 330° C. At too low a heating temperature, there is a decrease in the rate of removal of low-molecular-weight components and solvent residues from the thermoplastic resin. At too high a heating temperature, the thermoplastic resin is vulnerable to decomposition by heat.

The heating temperatures in the aforesaid range are generally higher than the temperatures at which thermoplastic resins for optical disk substrates are prepared. With increasing heating temperatures, the resins suffer from discolorations by heat, which are not preferable for the thermoplastic resins for optical disc substrates, because of resulting in a light transmittance drop. When those resins are used for magnetic disc substrates, however, such discolorations as occurring upon heating have no influences on errors whatsoever.

The reduced pressure used in the direct drying method is usually 26.7 kPa or lower, preferably 13.4 kPa or lower, and more preferably 6.7 kPa or lower.

When the direct drying method is used, drying may be carried out while the heating temperature and the reduced pressure are varied stepwise or continuously. In particular, it is preferable to vary the heating temperature and/or the reduced pressure in a two-step fashion. Two-step drying can easily be carried out by using two or more solvent removers that can be heated and operated under reduced pressure. For the solvent removers, a scraper type thin-film evaporator and a centrifugal thin-film evaporator is preferably used.

A preferable two-step drying process comprises the first step wherein the organic solvent solution such as the post-synthesis reaction solution of the thermoplastic resin is heated at a temperature of 270 to 340° C. under a pressure of 6.7 to 26.7 kPa thereby removing the organic solvent and other low-molecular-weight materials, and the second step wherein the resulting solution is heated at a temperature of 270 to 340° C. under a pressure of less than 6.7 kPa thereby removing the remaining low-molecular-weight materials.

In view of prevention of decomposition of the thermoplastic resin in the direct drying method, it is preferable to heat and dry under reduced pressure the organic solvent solution such as the post-synthesis reaction solution of the thermoplastic resin after the antioxidant having a molecular weight of 700 or higher has been added thereto. The antioxidant is added in an amount of usually 0.01 to 1 part by weight, preferably 0.02 to 0.8 part by weight, and more preferably 0.03 to 0.5 part by weight per 100 parts by weight of the thermoplastic resin. Too much antioxidant is likely to turn by itself into low-molecular-weight components or its decomposition products are likely to turn into such components, resulting in the generation of gases.

To reduce the number of foreign particles contained in the thermoplastic resin with a particle diameter of 0.5 $\mu$m or greater, it is preferable to filter the organic solvent solution such as the post-synthesis reaction solution of the thermoplastic resin, using a filter before it is heated and dried under reduced pressure. To be more specific, the post-synthesis reaction solution of the thermoplastic resin is filtered in a multistage manner using a filter having a large aperture size of the order of 1 to 5 $\mu$m, then a filter having an aperture size of 0.5 to 1 $\mu$m, and then a filter having an aperture size of approximately 0.2 $\mu$m. Alternatively, those methods may be combined together in a suitable manner. Yet alternatively, the reaction solution may be filtered by sole use of a filter having adsorptive power due to zeta potential.

After filtration, the resin solution is heated under reduced pressure in such a closed system as to prevent entrance of foreign matter from outside environments for removal of volatile components. Then, the resin is palletized in an environment of high cleanness such as in a clean room. The cleanness is placed under such strict control as to achieve a class of about 1,000 or lower, and preferably a class of about 100 or lower.

In view of removal of the low-molecular-weight component and reductions in the amount of gases generated, the method (iii) is preferred, wherein a molding blank material such as a pellet comprising the thermoplastic resin is dried prior to molding. To dry the pellet, drying is carried out while the pellet is retained at a temperature lower than the glass transition temperature, Tg, of the thermoplastic resin under a reduced pressure of 26.7 kPa or lower for 0.5 hour or longer. The heating temperature for the pellet is in the range of preferably (Tg-100° C.) to (Tg-2° C.), and more preferably (Tg-50° C.) to (Tg-5° C.), and the reduced pressure is preferably 13.4 kPa or lower, and more preferably 6.7 kPa or lower. The pellet is preferably dried in a clean room having a class of cleanness of approximately 1,000.

By the aforesaid method, it is possible to obtain a pellet in which the content of low-molecular-weight components having a molecular weight of 1,000 or less is significantly reduced. By combining together the aforesaid respective methods in various manners, it is also possible to obtain a pellet in which the number of particles having a particle diameter of 0.5 $\mu$m or greater is controlled up to $1\times10^4$/g or smaller.

(II) Additives

The thermoplastic resin may contain various additives represented by antioxidants, parting agents, lubricants, weather stabilizers, coloring agents (dyes and pigments), antistatic agents, soft polymers, and resins other than the thermoplastic resin.

Some additives, which are likely to bleed on the surface of the magnetic disk substrate or contain large amounts of low-molecular-weight components, are not preferred. It is preferable to use additives having a high molecular weight in reduced amounts. The additives have a molecular weight of preferably 700 or higher, and more preferably 1,000 or higher, and be used in an amount of usually 0.01 to 1.0 part by weight, preferably 0.02 to 0.8 part by weight, and more preferably 0.03 to 0.5 part by weight per 100 parts by weight of the thermoplastic resin although varying with the types of the additives.

While the additives may be used for molding in admixture with the molding blank material such as the pellet, it is preferable that they are added to the organic solvent solution such as the post-synthesis reaction solution of the thermoplastic resin for the purpose of removing the low-molecular-weight component.

(III) Molding Processes

Usually but not exclusively, hot-melt molding processes and solution casting processes are all usable to mold the thermoplastic resin into a magnetic disk substrate. For mass production, however, it is preferable to rely on the hot-melt molding processes represented by injection molding, extrusion molding, and compression molding. In view of the dimensional accuracy of the substrate, prevention of a warp in the substrate, the surface precision of the substrate, etc., it is particularly preferable to rely on injection molding. To mold the thermoplastic resin into a magnetic disk substrate by hot-melt molding, the molding is preferably carried out after the thermoplastic resin is palletized.

The amount of gases generated from the magnetic disk substrate, too, affects the molding conditions for the magnetic disk substrate. Given a conventional molding machine for optical disk substrates, there is no critical limitation on the type of the injection molding machine used. Specifically, injection molding is preferably carried out using a mold to which a stamper for magnetic disks is attached.

Although varying with the type of resin, the injection molding temperature (resin temperature) is in the range of usually 200 to 400° C., preferably 250 to 390° C., and more preferably 300 to 380° C. when the alicyclic structure-containing polymer resin is used. As long as the molding temperature is in the aforesaid range, the surface roughness, transferability, mechanical properties, etc. of the substrate are excellent, and the resin is kept from decomposition by shear force and heat so that the amount of gases generated from the magnetic disk substrate remains reduced. The mold temperature is in the range of usually 70 to 140° C., preferably 90 to 140° C., and more preferably 90 to 130° C.

As long as the mold temperature is in the aforesaid range, the transferability of the magnetic disk substrate is excellent.

The molding of the thermoplastic resin into a magnetic disk substrate is preferably carried out in an environment having high cleanness such as in a clear room. The cleanness during molding is preferably placed under such strict control as to achieve a class of about 1,000 or less, and preferably about 100 or less.

By using the thermoplastic resin with the aforesaid process, it is possible to obtain a magnetic disk substrate in which, upon held at 90° C. in 1 hour, the amount of gases generated is limited to 100 $\mu g/cm^2$ or less. By molding into a magnetic disk substrate the thermoplastic resin in which the number of particles having a particle diameter of 0.5 $\mu m$ or greater is controlled to $1 \times 10^4$/g or less, it is possible to reduce the number of particles contained in the magnetic disk substrate with a particle diameter of 0.5 $\mu m$ or greater down to $1 \times 10^4$/g or less.

Preferably for the magnetic disk substrate of the invention, the amount of gases generated is not only significantly reduced but also the number of pits having a depth of 20 nm or greater as measured from the surface is reduced. In addition, on the surface of the substrate there is substantially no projection having a height of 50 nm or greater.

4. Magnetic Disk

The magnetic disk of the present invention is used as a magnetic recording medium for storing data in an information processor like a computer. For instance, the magnetic disk of the invention is used as a hard disk.

Hard disks have a recording density of usually 100 megabytes (MB) or greater, and recently developed hard disks have a recording density of as large as 1 gigabyte (GB) or greater. A hard disk has a rotation speed in the range of usually 3,000 to 8,000 rpm, and magnetic recording signals are sensed by a magnetic head that is located proximately to and floated over the surface of a magnetic disk.

The magnetic disk comprises a magnetic recording film formed on the magnetic disk substrate of the invention. The magnetic recording film is generally composed of an underlying layer, a magnetic layer and a lubricant coating layer.

Given below are some illustrative examples of the magnetic disk substrate of the invention and the magnetic disk constructed using the same.

The magnetic disk substrate preferably has a diameter of 30 to 200 mm and a thickness of 0.2 to 5 mm. A typical hard disk has a disk form having a diameter of 65 mm and a thickness of 1.2 mm. By way of illustration and not by way of limitation, the magnetic disk substrate has a structure comprising a recording area-forming portion, a clamp area at the inner radius of the substrate and a landing area at the outer radius of the substrate.

The recording area-forming portion provides a recording area of the magnetic disk when formed of the magnetic disk substrate. This recording area-forming portion is composed of a data area-forming portion at which there is formed an area with data actually recorded thereon and a servo mark-forming portion at which there are formed servo marks for controlling (tracking) addresses and their positions in recording tracks.

On the magnetic disk substrate there is provided an underlying layer, on which a magnetic layer is formed. On the magnetic layer there are provided a protective film and a lubricant coating layer. To be more specific, the underlying layer formed of chromium (Cr), molybdenum (Mo) or the like (and having a thickness of about 100 nm on the average), the magnetic layer formed of CoCrPt, CoPt, CoPd, Co, Pt, Pd or the like (and having a thickness of about 60 nm on the average) and the protective film formed of C, $SiO_2$ or the like (and having a thickness of about 18 nm on the average) are successively formed on the magnetic disk substrate by means of sputtering.

For instance, sputtering is carried out in an argon (Ar) gas atmosphere using an in-line static opposition type DC magnetron sputtering system and employing an alloy target for the magnetic layer. A lubricant (e.g., Fomblin Z-DOL available from Montecatini) may be coated on the protective film by dipping or other suitable coating means.

Figure 1:
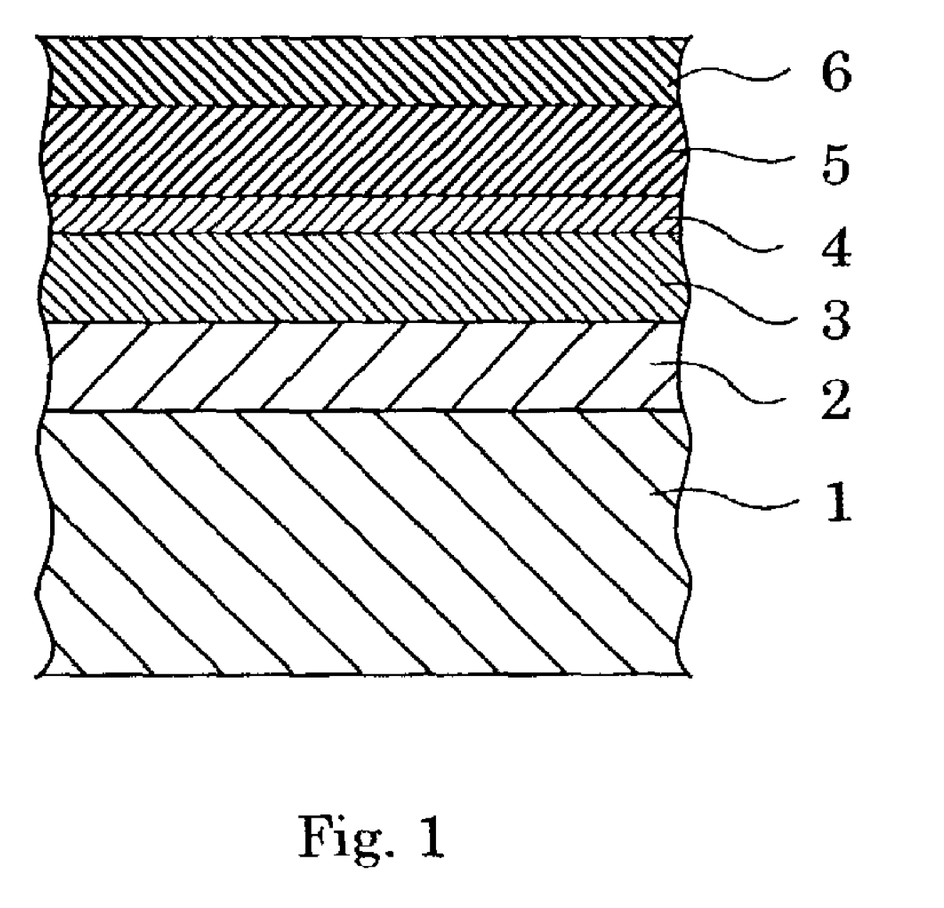
FIG. 1 is illustrative in section of one exemplary layer arrangement of the magnetic disk according to the present invention.

One specific example of the magnetic disk layer arrangement is shown in FIG. 1. FIG. 1 is illustrative in section of one example of the layer arrangement of the magnetic disk. A Cr underlying layer 2, a CoPtCr layer 3, a Cr intermediate layer 4, a CoPtCr layer 5 and a carbon (C) protective layer 6 are formed on a magnetic disk substrate 1 in this order. The magnetic recording film has a thickness of usually about 100 nm or less.

EXAMPLES

The present invention is now explained more specifically but not exclusively with reference to inventive examples and comparative examples wherein, unless otherwise stated, the "parts" and "%" are given on a weight basis. Set out below are various physical properties and how to measure them.

(1) Weight-Average Molecular Weight (Mw):

The weight-average molecular weight (Mw) was determined in terms of polyisoprene as measured by gel permeation chromatography (GPC) using cyclohexane as a solvent.

(2) Rate of Hydrogenation (%):

The rate of hydrogenation of the main chain and aromatic ring of a norbornene polymer was measured by $^1$H-NMR.

(3) Glass Transition Temperature:

The glass transition temperature (Tg) was measured according to JIS-K7121.

(4) Molecular Weight of Low-Molecular-Weight Components:

The weight-average molecular weight of a norbornene polymer was determined in terms of polyisoprene as measured by gel permeation chromatography (GPC) using cyclohexane as a solvent. Then, the contents of low-molecular-weight components having a molecular weight of 1,000 or lower were calculated by the proportion (%) of (B) with respect to [(A)+(B)] where (A) is the polymer peak area on the obtained chart and (B) is the peak area for the components having a molecular weight of 1,000 or lower.

(5) Amount of Gases Generated:

The amount of gases generated from the magnetic disk substrate was measured as follows. The magnetic disk was cut with a constant surface area to prepare samples. Each sample was heated at 90° C. for 1 hour in a stream of nitrogen gas with a purity of 99.999% or greater. The gases given out of the sample were collected and concentrated by a solid adsorbent (an active charcoal tube), and the amount of the adsorbed gases was measured by dynamic headspace gas chromatography mass spectrometry (DHS-GC-MS).

(6) Number of Pits on the Substrate:

The number of pits on the magnetic disk substrate was counted as follows. After a magnetic recording film was formed on the magnetic disk substrate to obtain a magnetic disk, the sites where errors occurred all over the surface of the magnetic disk scanned by a magnetic head were examined with a bit error analyzer (Bit Analyzer 622 manufactured by SyntheSye Research). The sites where errors occurred were each analyzed under a scanning probe microscope (NanoscopeIIIa manufactured by Digital Instrument) to count the number of pits having a depth of 20 nm or greater.

(7) Rate of Unpeeled Recording Film:

After a magnetic recording film was formed on the surface of the magnetic disk substrate, a mending tape of 5 mm×5 mm size was applied on ten sites of the magnetic recording film and then peeled off to measure the area of unpeeled film sites. The rate of the unpeeled film sites was calculated from Rate of unpeeled film site=(the area of unpeeled film sites/the whole area of contact of the mending tape)×100

(8) Scan Capability:

An induction magnetic head having a gap length of 0.6 $\mu$m and a track width of 3.5 $\mu$m was used for a write magnetic head, and an MR head having a gap length of 0.36 $\mu$m and a track width of 2.5 $\mu$m was used for a read magnetic head. With the magnetic head floated 70 nm away from the magnetic disk, signals were written to and read out of the magnetic disk to measure readability (S/N value). The capital A indicates that signals of 14 MHz frequency at a peripheral speed of 7 m/sec. have an S/N value of 25 dB or greater, and the capital B shows that those signals have an S/N value of less than 25 dB.

Example 1

I. Resin Synthesis

A norbornene monomer mixture of 90% of 6-methyl-1,4:5,8-dimethano-1,4,4a,5,6,7,8,8a-octahydronaphthalene (hereinafter MTD for short) and 10% of 5-methyl-2-norbornene was subjected to ring-opening polymerization thereby obtaining a norbornene ring-opening polymer.

One hundred (100) parts of the obtained ring-opening polymer were dissolved in 400 parts of cyclohexane to obtain a solution, to which 5 parts of a nickel-alumina catalyst (manufactured by Nikki Kagaku) were added as a hydrogenation catalyst. While the solution was stirred at a hydrogen pressure of 50 kg/cm$^2$, it was heated to a temperature of 200° C. Then, the solution was subjected to a four-hour reaction to obtain a reaction solution containing a hydrogenated product of a ring-opening polymer (hereinafter called the "hydrogenated polymer"). Using Radiolight #500 as a filtration bed, the reaction solution was subjected to filtration under a pressure of 2.5 kg/cm$^2$ (Funda Filter manufactured by Ishikawajima-Harima Heavy Industries) for removal of the hydrogenation catalyst, thereby obtaining a colorless transparent reaction solution.

II. Processing of the Resin

An antioxidant (3,3',3",5,5',5"-hexa-tert-butyl-a,a', a"-(mesitylene-2,4,6-triyl)tri-p-cresol (molecular weight=775) was added to the aforesaid reaction solution at a proportion of 0.05 part per 100 parts of the hydrogenated polymer. Then, the reaction solution was filtered through a metal fiber filter having an aperture size of 3 $\mu$m (manufactured by Nichidai), then through a zeta plus filter 30H having an aperture size of 0.5 to 1 $\mu$m (manufactured by Cuno), and finally through a metal fiber filter having an aperture size of 0.2 $\mu$m (manufactured by Nichidai), thereby removing foreign matter.

The solution from which foreign matter had been removed was rid of the solvent cyclohexane and other low-molecular-weight components responsible for the generation of gases, using a cylindrical condensation dryer (Hitachi, Ltd.). In this way, the hydrogenated polymer was recovered. Removal of the solvent and low-molecular-weight components was carried out in a two-step manner.

The cylindrical condensation drier was run under the following operating conditions:

the first step at a temperature of 280° C. and a pressure of 13.3 kPa (100 Torr), and the second step at a temperature of 280° C. and a pressure of 0.7 kPa (5 Torr).

III. Pelletizing

In a clean room of class 1,000, the hydrogenated polymer was hot extruded through a die joined directly to the condensation dryer, then cooled with water, then pelletized by a pelletizer (OSP-2 manufactured by Osada Seisakusho), and finally recovered.

The pellet was dissolved in toluene to prepare a 10% toluene solution for gas chromatography analysis. As a result, the amount of cyclohexane remaining in the pellet was found to be lower than the lower limit of detection.

The heat decomposition temperature of the hydrogenated polymer by TG/DTA analysis was 442° C. The molecular weight in terms of a polystyrene of the hydrogenated polymer by GPC analysis was 27,000 for the number-average molecular weight (Mn) and 56,000 for the weight-average molecular weight (Mw). The glass transition temperature (Tg) of the hydrogenated polymer was 140° C. as measured by DSC analysis. The rate of hydrogenation of the pellet was substantially 100% as measured by $^1$H-NMR spectroscopy in the form of a bichloroform solution.

The recovered pellet was stored in a stainless closed vessel polished on its surface.

IV. Drying of the Pellet

The pellet stored in the stainless closed vessel was pre-dried under a pressure of 5 kPa and a temperature of 100° C. for 4 hours in a vacuum drier installed in a clean room having a cleanness of class 1,000.

V. Molding of the Magnetic Disk Substrate

Within 30 minutes after the pellet was taken out of the drier, the pellet was injection molded at a resin temperature of 320° C. and a mold temperature of 120° C. through an injection molding machine (DISK3 manufactured by Sumitomo Heavy Industries, Ltd.) installed in the same clean room, thereby forming a magnetic disk substrate of 65 mm in diameter and 1.2 mm in thickness. The mold system was held in an environment having a cleanness of class 100 while the mold was housed therein with a nickel stamper having a smooth surface (having a center-line average roughness of Ra=1 nm).

The center-line average roughness, Ra, of the thus obtained magnetic disk substrate was 1.0 to 1.1 nm much on the same level as the surface roughness of the stamper. This magnetic disk was set in a magnetic disk system. While the rotation speed of the magnetic disk substrate was controlled such that a floating head was caused to float in the state of floating quantity of 50 nm, acceleration signals upon collision were detected by a piezo element attached to a slider. As a result, it was found that on the surface of the magnetic disk substrate there was no projection of 50 nm or greater in height.

One point five (1.5) grams of a sample cut out of the magnetic disk substrate were dissolved at a concentration of 1.5% in toluene refined by filtration through a cartridge filter having an aperture size of 0.2 μm. Then, a light scattering type fine particle detector (KS-58 manufactured by Ryon) was used to count the number of foreign particles contained in the toluene solution with a particle diameter of 0.5 μm or greater. As a result, the toluene solution was found to contain $2.3 \times 10^3$ such particles per gram.

VI. Formation of the Magnetic Recording Film

Using a disk sputtering system C-3010 (manufactured by Aneruba), a chromium (Cr) underlying layer, a layer composed of cobalt (Co)/platinum (Pt)/Cr (CoPtCr layer), a Cr intermediate layer, a CoPtCr layer and a carbon protective film were successively formed on the magnetic disk substrate obtained as mentioned above, thereby forming a magnetic recording film. The total thickness of the magnetic recording film was 90 nm.

The amount of gases generated from this magnetic disk substrate was found to be 10 μg/cm². The magnetic disk substrate was then estimated about its physical properties and characteristics. The results are tabulated in Table 1.

Example 2

A magnetic disk substrate and a magnetic disk were prepared as in Example 1 with the exception that the running conditions for the cylindrical condensation drier were changed to:
the first step at 280° C. and a pressure of 13.3 kPa, and
the second step at 280° C. and a pressure of 0.0 kPa (vacuum state).

On this magnetic disk substrate there was no projection of 50 nm or greater in height, and the amount of gases generated from the magnetic disk substrate was 2 μg/cm². The results are tabulated in Table 1.

Example 3

A magnetic disk substrate and a magnetic disk were prepared as in Example 1 with the exception that the running conditions for the cylindrical condensation drier were changed to:
the first step at 270° C. and a pressure of 13.3 kPa, and
the second step at 270° C. and a pressure of 0.0 kPa (vacuum state).

On this magnetic disk substrate there was no projection of 50 nm or greater in height, and the amount of gases generated from the magnetic disk substrate was 60 μg/cm². The results are tabulated in Table 1.

Comparative Example 1

A magnetic disk substrate and a magnetic disk were prepared as in Example 1 with the exception that the running conditions for the cylindrical condensation drier were changed to:
the first step at 260° C. and a pressure of 13.3 kPa, and
the second step at 265° C. and a pressure of 1.3 kPa (10 Torr);

octadecyl-3-(3,5-di-tert-butyl-4-hydroxyphenyl)propionate (molecular weight=531) was used as the antioxidant; and the pellet was not subjected to heating under reduced pressure. On this magnetic disk substrate there was no projection of 50 nm or greater in height, but the amount of gases generated from the magnetic disk substrate was increased to 150 μg/cm². The results are tabulated in Table 1.

TABLE 1

|  | Ex.1 | Ex.2 | Ex.3 | Comp. Ex.1 |
|---|---|---|---|---|
| Drying Condition <Concentration Drier> |  |  |  |  |
| 1st step | 280° C./ 13.3 kPa | 280° C./ 13.3 kPa | 270° C./ 13.3 kPa | 260° C./ 13.3 kPa |
| 2nd step | 280° C./ 0.7 kPa | 280° C./ 0.0 kPa | 270° C./ 0.0 kPa | 265° C./ 1.3 kPa |
| <Pellet> | 100° C./ 5 kPa/ 4 hs | 100° C./ 5 kPa/ 4 hs | 100° C./ 5 kPa/ 4 hs | — |
| Content of low-molecular-weight component, wt% | 0.5 | 0.2 | 1.0 | 2.6 |
| Number per g of particles having a particle diameter of 0.5 μm or greater |  |  |  |  |
| Resin | $2.1 \times 10^3$ | $2.0 \times 10^3$ | $2.2 \times 10^3$ | $2.3 \times 10^3$ |
| Substrate | $2.3 \times 10^3$ | $2.2 \times 10^3$ | $2.5 \times 10^3$ | $2.6 \times 10^3$ |
| Amount of gases generated from substrate upon held at 90° C. for 1 hour, μg/cm² | 10 | 2 | 60 | 150 |
| Number of pits found on the surface of substrate with a depth of 20 nm or greater | 3.2 | 1.7 | 7.2 | 60.8 |
| Adhesion with magnetic recording film (unpeeling rate, %) | 100 | 100 | 100 | 50 |
| Scan capability | A | A | A | B |

INDUSTRIAL APPLICABILITY

The present invention provides a magnetic disk substrate that is improved in terms of adhesion with a magnetic recording film, substantially free from errors upon writing and reading of data and excellent in scan capability and a magnetic disk obtained using the same. The present invention also provides a process of manufacturing a magnetic disk substrate that has such excellent properties. The magnetic disk substrate and magnetic disk of the present invention are useful for hard disks that are external memory devices for computers, etc.

What is claimed is:

1. A magnetic disk substrate formed of a thermoplastic resin selected from the group consisting of poly(methyl methacrylate), polycarbonate resins and norbornene polymers and has a glass transition temperature of 50 to 300° C., wherein the amount of gases generated therefrom upon held at 90 C for 1 hour is 100 μg/cm² or less.

2. The magnetic disk substrate according to claim 1, wherein the thermoplastic resin contains low-molecular-weight components having a molecular weight of 1,000 or lower in the proportion of 2% by weight or less.

3. The magnetic disk substrate according to claim 2, wherein the low-molecular-weight components include unreacted monomers, oligomers, low-molecular-weight polymers, resin-decomposed products, additives, decomposed products of additives, water and organic solvents or mixtures thereof.

4. The magnetic disk substrate according to claim 1, wherein the thermoplastic resin is controled such that the number of particles having a particle diameter of 0.5 μm or greater is reduce to $1 \times 10^4$/g or less.

5. The magnetic disk substrate according to claim 1, wherein the thermoplastic resin is a norbornene polymer which is at least one thermoplastic norbornene polymer selected from the group consisting of a ring-opening polymer of a norbornene monomer, a hydrogenated product of a ring-opening polymer of a norbornene monomer, an addition polymer of a norbornene monomer and an addition copolymer of a norbornene monomer and a vinyl compound.

6. The magnetic disk substrate according to claim 5, wherein the norbornene polymer is a hydrogenated product of a ring-opening polymer of a norbornene monomer.

7. The magnetic disk substrate according to claim 1, wherein the the thermoplastic resin is a norbornene polymer which has a weight-average molecular weight in the range of 10,000 to 100,000.

8. The magnetic disk substrate according to claim 1, which is a disk having a diameter of 30 to 200 mm and a thickness of 0.2 to 5 mm.

9. The magnetic disk substrate according to claim 1, wherein the number of particles contained therein with a particle diameter of 0.5 $\mu$m or greater is $1 \times 10^4$/g or less.

10. The magnetic disk substrate according to claim 1, wherein the number of pits having a depth of 20 nm or greater, found on the surface to be scanned by a floating head, is 20 or less.

11. A magnetic disk which comprises a magnetic recording film formed on a magnetic disk substrate as recited in any one of claims 1, 2, 3, 4, 5, 6, 7, 8, 9, and 10.

* * * * *